Sept. 30, 1941. A. ORSCHELN 2,257,530

TAIL GATE MOUNTING MEANS

Filed Jan. 24, 1941

Inventor
Albert Orscheln
By H. B. Willson & Co.
Attorneys

Patented Sept. 30, 1941

2,257,530

UNITED STATES PATENT OFFICE 2,257,530

TAIL GATE MOUNTING MEANS

Albert Orscheln, Moberly, Mo.

Application January 24, 1941, Serial No. 375,859

1 Claim. (Cl. 296—57)

The invention aims to provide a new and improved construction for locking a vehicle body tail gate or the like in closed position and preferably also for supporting said gate in an open horizontal position, overcoming the necessity of using chains and the like for these purposes.

With the foregoing in view, the invention resides in the novel subject matter hereinafter described and claimed, description being accomplished by reference to the accompanying drawing.

Figures 1, 2, 3, 4:
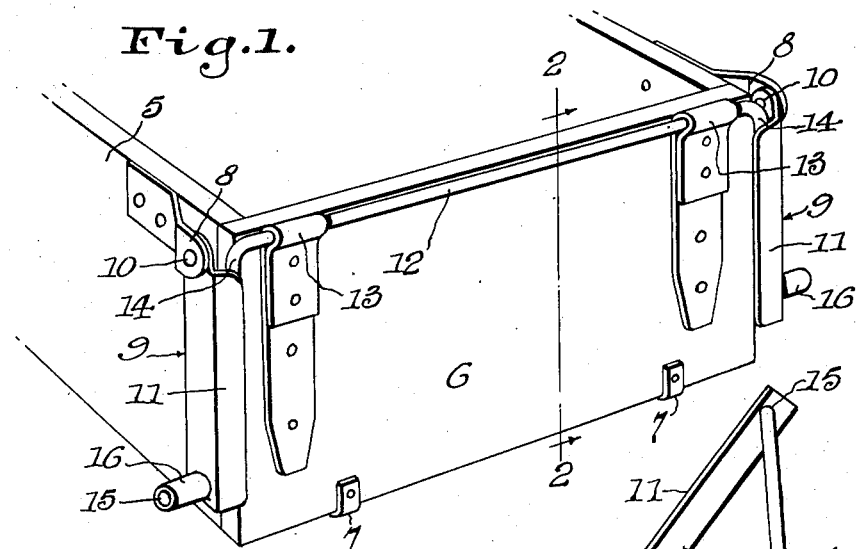
Figure 1 is a perspective view.
Figure 2 is a vertical sectional view on line 2—2 of Figure 1.
Figure 3 is a view similar to Fig. 2 showing the tail gate released and partly open.
Figure 4 is another sectional view illustrating the manner in which the tail gate is supported in its open horizontal position.

An illustrative construction has been disclosed in the drawing and will be rather specifically described, with the understanding, however, that variations may be made within the scope of the invention as claimed.

A portion 5 of a truck body is shown, said body having the usual tail gate 6 hinged at 7 for rearward and downward swinging.

Two suitable brackets 8 are secured to and project rearwardly from the body 5, and two vertical links 9 normally hang vertically downward from the rear ends of said brackets, the upper ends of said links being pivoted to said brackets by means of axially alined pivots 10. The rear edge of each link 9 is provided, in the present disclosure, with a longitudinal inwardly projecting flange 11 which performs a function hereinafter explained.

Substantially axially alined with the pivots 10 and extending horizontally along the upper portion of the gate 6 is a rock shaft 12 (of sectional construction if desired) mounted in appropriate bearings 13. The ends of this rock shaft are bent downwardly in the present disclosure to provide downwardly projecting arms or links 14, and the lower ends of these arms or links are pivoted on axially alined pivots 15 to the lower ends of the links 9. In the present showing, the pivots 15 are formed by outwardly bending the ends of the arms or links 14, and these pivots are received in outwardly projecting bearings 16 on the links 9, either of said bearings constituting a handle by means of which the arms or links may be rearwardly and upwardly swung when the tail gate is to be opened.

From Figs. 1 and 2, it will be observed that the flanges 11 of the links 9 are normally behind and abut the rear sides of the arms or links 14. Thus, said flanges 11 form tail gate stops and the tail gate cannot be opened until said arms or links 14 and said links 9 are swung outwardly and upwardly to dispose said flanges 11 in front of said arms or links 14 (see Fig. 3). When the links are moved in this manner, however, the tail gate may be swung rearwardly and downwardly, and the links are preferably of such length that they will then support said tail gate in a horizontal open position as seen in Figure 4. When the tail gate is again closed and the links returned to their normal positions, they again lock said gate in closed position.

From the foregoing taken in connection with the accompanying drawing, it will be seen that novel and advantageous provision has been made for carrying out the object of the invention, and while certain details have been illustrated, attention is again invited to the possibility of making variations within the scope of the invention as claimed. Furthermore, while the invention is intended primarily for use in connection with a tail gate of a vehicle, it could well be used with other hinged closures and it is, therefore, to be understood that certain terms used herein, for example, "gate," "rearwardly," "behind," and "in front," are not to be considered in too limiting a sense.

I claim:

In combination with a vehicle body having a gate hinged at its lower edge to swing rearwardly and downwardly; one vertically hanging inherently rigid link disposed at one vertical edge of said gate at the exterior of said body, one pivot connecting the upper end of said one inherently rigid link with said body, a second vertically hanging inherently rigid link adjacent said one inherently rigid link and also disposed at the exterior of said body, a second pivot connecting the upper end of said second inherently rigid link with said gate, said second pivot being substantially alined with said one pivot, a third pivot connecting the lower ends of said inherently rigid links with each other, said links having abutting portions which prohibit rearward swinging of said gate until said links are swung rearwardly and upwardly, and an elongated bearing for said third pivot, said bearing being rigidly secured to the lower end of one of said links, projecting laterally outward therefrom, and constituting a handle for use in swinging said links to and from gate-closed position.

ALBERT ORSCHELN.